(12) United States Patent
Lam et al.

(10) Patent No.: US 12,744,686 B2
(45) Date of Patent: Sep. 22, 2026

(54) NETWORK RESOURCES LOG VALIDATION METHODS AND PRUNING MECHANISMS USING BLOCKCHAIN

(71) Applicant: Hong Kong Applied Science and Technology Research Institute Co., Ltd., Shatin (HK)

(72) Inventors: Tak Wing Lam, Yau Tong (HK); Kei Keung Hung, Quarry Bay (HK); Tak Fuk Wong, Kwai Chung (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 153 days.

(21) Appl. No.: 18/757,768

(22) Filed: Jun. 28, 2024

(65) Prior Publication Data

US 2026/0005879 A1 Jan. 1, 2026

(51) Int. Cl.
*H04L 9/00* (2022.01)

(52) U.S. Cl.
CPC .................................... *H04L 9/50* (2022.05)

(58) Field of Classification Search
CPC ........................................................ H04L 9/50
USPC ........................................................ 380/270
See application file for complete search history.

(56) References Cited

U.S. PATENT DOCUMENTS 10,949,557 B2 3/2021 Patil et al.
11,036,395 B2 6/2021 Karame et al.
11,196,542 B2 12/2021 Natarajan et al.
2020/0125269 A1 4/2020 Karame et al.
2020/0195495 A1 6/2020 Parker et al.
2023/0088566 A1 * 3/2023 Ejobe .................... H04L 63/104 726/27

FOREIGN PATENT DOCUMENTS

CN 111447265 A 7/2020
CN 113342774 A * 9/2021 ............ G06F 16/27
CN 117177211 A 12/2023
CN 118120183 A 5/2024
WO WO-2022133210 A2 * 6/2022 ............ G06Q 30/06

OTHER PUBLICATIONS

International Search Report and the Written Opinion of the International Searching Authority for International Application No. PCT/CN2024/104016, dated Feb. 17, 2025, pp. 1-8.

* cited by examiner

*Primary Examiner* — Aubrey H Wyszynski
(74) *Attorney, Agent, or Firm* — Warner Norcross + Judd LLP

(57) ABSTRACT

A computer-implemented method of reducing size of a blockchain. The method includes the steps of providing a series of data files; generating, at a time interval, a series of processed files based on filtering and/or aggregation of the series of data files; for each one of the series of processed files, computing a hash value; adding the hash values respectively to a blockchain as blocks; and storing the series of processed files off the blockchain. The proposed invention aims to develop methods to monitor and validate SLA on the blockchain. It facilitates the faster creation of network resource sharing in a 5G network and reducing the blockchain computational resources required.

9 Claims, 9 Drawing Sheets

SLA

| SLA ID | Provider ID | Tenant ID | Performance Requirement | SLA Period | Log Proof Condition | SLA Record Retention date Period |
|---|---|---|---|---|---|---|

| | |
|---|---|
| SLA ID | the id of service level agreement |
| Provider ID | the id of the provider |
| Tenant ID | the id of the tenant |
| Performance Requirement | the performance requirement of the SLA, e.g., :<br>R1: Latency: The maximum allowable round-trip latency for data transmission within the network slice is 10 milliseconds<br>R2: Reliability: The network slice should achieve a packet delivery success rate of at least 99.999% |
| SLA Period | the period of the SLA |
| Log Proof Condition | the condition the provider needs to commit the proof of network log to blockchain (e.g., hourly) |
| SLA Record Retention Date | the date (time) that the SLA proof log can be removed |

Fig. 4

| | |
|---|---|
| Proof Period | The time period of the proof<br>e.g., Unix time from 1707270896486 to 1707272896486 |
| Hashed (Filtered Aggregated Log) | Filtered Aggregated Log: the aggregated log related to the performance requirement for an SLA in the proof period |

| Block ID | the id of the block (e.g., address) |
|---|---|
| SLA ID | the id of service level agreement |
| Proof Period | How often the log proof is generated |
| Hashed Log Proof | hashed(Filtered Aggregated Log) |
| Filtered Aggregated Log | Filtered Aggregated Log |
| Hash function | the hash function used to hash the log proof |

NETWORK RESOURCES LOG VALIDATION METHODS AND PRUNING MECHANISMS USING BLOCKCHAIN

FIELD OF INVENTION

This invention relates to the field of network resource management of cellular networks, for example network slicing in 5G mobile networks.

BACKGROUND OF INVENTION

Network sharing in modern cellular networks such as 5G networks is becoming a popular alternative for mobile operators. Network sharing allows dividing of a physical network into isolated logical networks. It can also cater to different service requirements and enable efficient resource sharing (e.g., ultra-low latency for vehicle-to-vehicle application). Service-level agreement (SLA) is used by the network resources providers and the tenants to define QoS (Quality of Service) requirements (e.g., bandwidth, throughput, and latency, etc.).

Nowadays, blockchain plays an important role in facilitating network resource sharing such as network slicing. Blockchain provides a decentralized and tamper-proof ledger to create and validate for network slice transactions. A smart contract is a decentralized computer program running on a blockchain network that automatically and deterministically executes agreements based on predefined conditions. Smart contracts can predefine rules to automate and enforce the management of network slices.

However, validating SLA using raw network logs in smart contract is computationally intensive and increases blockchain size tremendously. In addition, when SLA is overdue, there is no mechanism to remove the overdue records on blockchain, and validation process will be degraded.

SUMMARY OF INVENTION

Therefore, one of the aims of the invention is to develop methods suitable for monitoring and validating SLA on the blockchain, which could facilitate faster creation of network resource sharing in a 5G network and reduce computational resources required in the blockchain.

Accordingly, the present invention, in one aspect, is a computer-implemented method of reducing size of a blockchain. The method includes the steps of providing a series of data files; generating, at a time interval, a series of processed files based on filtering and/or aggregation of the series of data files; for each one of the series of processed files, computing a hash value; adding the hash values respectively to a blockchain as blocks; and storing the series of processed files off the blockchain.

In some embodiments, the series of data files are network resource log files of a cellular network.

In some embodiments, the series of processed files are related to performance requirement for a SLA of the cellular network in a proof period.

In some embodiments, the proof period is equal to a length of the time interval.

In some embodiments, a number of the processed files in the series of the processed files, is smaller than a number of the data files in the series of the data files.

In some embodiments, one of the series of processed files is an aggregation of two of the series of the data files which are associated with the performance requirement.

In some embodiments, the blockchain further includes, beside the hash values, a block being a record of the SLA.

In some embodiments, the record of the SLA contains the performance requirement, the proof period, a period of the SLA, and a SLA record retention date.

In some embodiments, in the step of adding the hash values respectively to a blockchain as blocks, the hash values are sequentially added to the blockchain at the time interval.

In some embodiments, the blockchain is accessible by a provider and a tenant of network resource.

In some embodiments, the step of storing the series of processed files off the blockchain includes providing, by the blockchain, the hash values to the provider; and storing, by the provider, the hash values associated their respective processed files in a database.

According to another aspect of the invention, there is provided a computer-implemented method of pruning a blockchain containing SLA records of a cellular network. The method includes steps of identifying, on a blockchain, a SLA record that is overdue; identifying, on the blockchain, a latest block representing a proof of the SLA record; determining an optimized location on the blockchain that corresponds to a gain that is maximum; setting a next block after the optimized location as a pseudo genesis block; and defining part of the blockchain that starts with the pseudo genesis block as a pruned chain.

In some embodiments, the SLA record that is overdue has a retention date which has passed.

In some embodiments, the gain is calculated as a number of block(s) that can be pruned before the pseudo genesis block, minus a number of extra block(s) that need to be replicated after the pseudo genesis block.

In some embodiments, the extra block(s) contains one or more blocks each representing a non-overdue SLA record or a log proof thereof.

In some embodiments, the log proof of the non-overdue SLA record is a hash value of a processed file based on filtering and/or aggregation of one or more data files. The data files are network resource log files of the cellular network.

In some embodiments, the method further contains, before the step of identifying a SLA record that is overdue on the blockchain, a step of determining a percentage of all overdue blocks on the blockchain among all blocks on the block chain. The method goes to the next step of identify the SLA record that is overdue only when the percentage is above a threshold.

In some embodiments, the step of identifying a SLA record that is overdue on the blockchain further includes identify more than one SLA records that are overdue. The step of identifying a latest block representing a proof of the SLA record on the blockchain, further contains identifying a latest block for each of the overdue SLA records.

According to a further aspect of the invention, there is provided a non-transitory computer-readable medium having computer instructions recorded thereon. The computer instructions, when executed on one or more processors, causing the one or more processors to perform operations according to the above-mentioned computer-implemented method of reducing size of a blockchain.

According to a further aspect of the invention, there is provided a non-transitory computer-readable medium having computer instructions recorded thereon. The computer instructions, when executed on one or more processors, causing the one or more processors to perform operations according to the above-mentioned computer-implemented method of pruning a blockchain containing SLA records of a cellular network.

According to a further aspect of the invention, there is provided a computing system that includes one or more processors; and memory containing instructions that, when executed by the one or more processors, cause the computing system to perform operations according to the above-mentioned computer-implemented method of reducing size of a blockchain.

According to a further aspect of the invention, there is provided a computing system that includes one or more processors; and memory containing instructions that, when executed by the one or more processors, cause the computing system to perform operations according to the above-mentioned computer-implemented method of pruning a blockchain containing SLA records of a cellular network.

One can see that various embodiments of the invention therefore provide different approaches which ultimately all reduce the size of a blockchain that is used for monitoring and validating SLAs by the use of network resources logs, for example logs related to network resource sharing like network slicing, SIM card access, etc. In some embodiments, hash values of log files are saved on the blockchain instead of log files themselves, which greatly reduces size of blocks and thus saves space. In some embodiments, the blockchain can be pruned with a target to maximize the gain of space saving, and as a result the size of part of the blockchain that is synchronized by peers can be reduced.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 4 shows data fields and their definitions in an exemplary SLA record.

DETAILED DESCRIPTION OF PREFERRED EMBODIMENTS

Network slicing is available within 5G networks that allows the creation of multiple isolated virtual networks within a single physical infrastructure. Each of these virtual networks, known as network slices, is customized to cater to specific requirements requested by different applications and/or devices. Network slicing is essential for efficiently supporting a wide range of services with varying service level requirements (SLR) in 5G mobile networks. These services include for example machine-type communication, ultra-reliable low latency communication (such as that for vehicle-to-vehicle application), and enhanced mobile broadband content delivery. In one practical example, each network slice is administered by a Mobile Virtual Network Operator (MVNO), where the infrastructure provider (owner of the telecommunication infrastructure) leases its physical resources to MVNOs, which share the underlying physical network. Based on assigned resources, an MVNO can autonomously deploy multiple network slices customized for various applications provided to its users.

On the other hand, in some networks the network resources are divided based on SIM card access. As skilled persons understand, The SIM card serves as a unique identifier for each UE (User Equipment) and is used by the network to authenticate and authorize the UE's access to network services. The SIM card contains an IMSI (International Mobile Subscriber Identity) which is a globally unique number identifying a particular subscriber. When a UE attempts to connect to the network, it presents its SIM card credentials. The network operator's systems verify the SIM card/IMSI to determine what network resources and services that particular subscriber is entitled to, based on their subscription plan (SLA). For example, some subscribers may have premium plans that allow them higher data speeds, more bandwidth, lower latency, or access to specialized network slices optimized for specific use cases. Other subscribers may have basic plans with more limited resources.

Figure 1A:
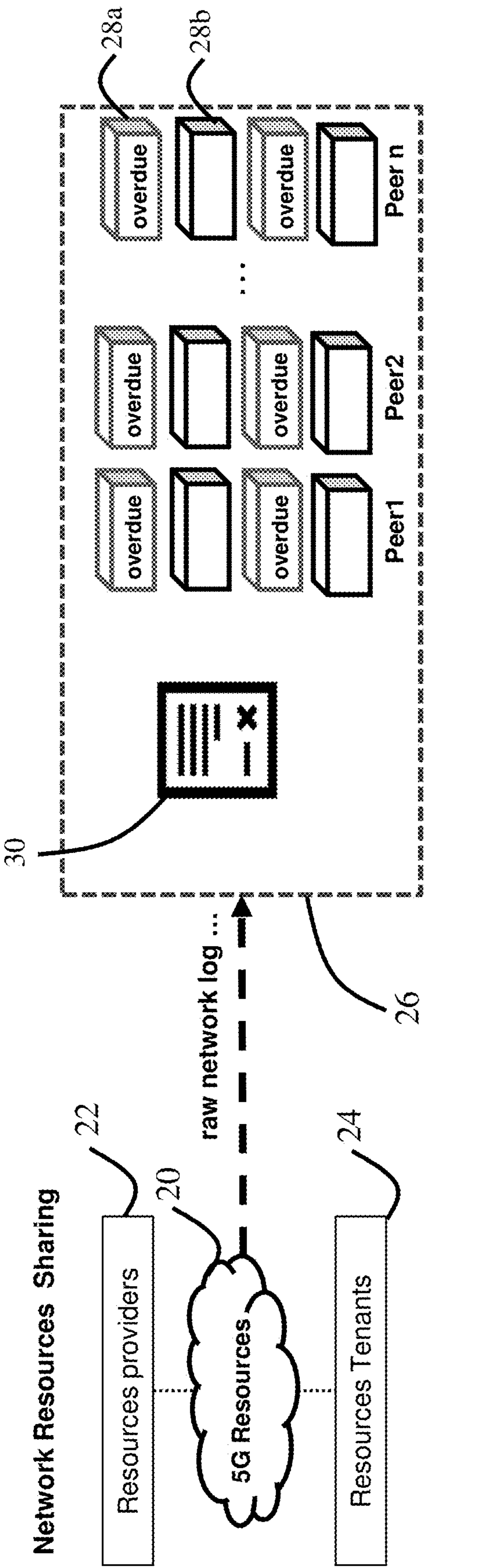
FIG. 1*a* shows a typical network resource sharing scheme making use of a blockchain and a smart contract associated with the blockchain for SLA verification.

FIG. 1*a* illustrates a typical scheme of network resources sharing in a 5G cellular network. As shown in the figure, 5G resources 20 are provided by resources providers 22 and for leasing to resources tenants 24. The providers 22 offer network services and resources, while the tenants 24 utilize the network slicing system as users or customers. Examples of the 5G resources 20 include but not limited to number and types of sub-slices, Physical Network Functions (PNF), Virtual Network Functions (VNF), CPU, I/O, memory, storage, etc. Once the resources are negotiated between the providers 22 and the tenants 24, SLAs have to be established. In particular, SLAs are used by the providers 22 and the tenants 24 to define at least QoS requirements (e.g., bandwidth, throughput, and latency, etc.) Note that there may be not only one SLA, but there could be different SLAs involving different stakeholders. The established SLA needs to be managed and monitored by the providers 22 and the tenants 24 in order to ensure that the service is well functioning.

Figure 1B:
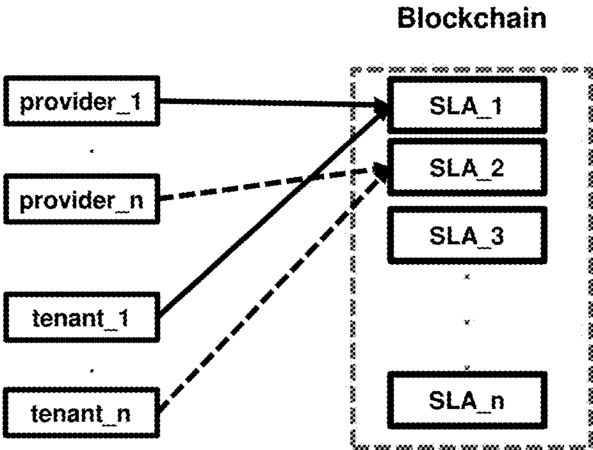
FIG. 1*b* shows examples of how particular providers and tenants access SLA records kept on a blockchain.

A blockchain 26 plays the important role in facilitating network resource sharing of the 5G resources 20. The blockchain 26 is used to monitor and validate the SLAs to ensure transparency and trust between the providers 22 and the tenants 24. In particular, the blockchain 26 provides a decentralized and tamper-proof ledger to create and validate network slice transaction, guaranteeing that the transactions are secure and immutable. A smart contract 30 is associated with the blockchain 26, which as a skilled person understands is an agreement between several parties in the form of computer code. The smart contact allows automated transactions when one or more contract conditions are met, without resorting to a third party. As shown in the example of FIG. 1*a*, various SLA records 28*a*, 28*b* for the SLAs are created by the smart contract 30 which are initialized by the providers 22 and tenants 24 on the blockchain 26 to define performance requirements and to validate whether the requirements are fulfilled. FIG. 1*b* shows examples of how particular providers and tenants access multiple SLA records in a blockchain, for example provider_1 and tenant_1 both access SLA_1 on the chain, and provider_n and tenant_n both access SLA_2 on the chain.

As long as the 5G resources 20 are being utilized, different network functions are in effect for performing network slicing and controlling the SLAs. For example, the network functions include Access and Mobility Management Function (AMF) which controls user equipment (UE) that have been authenticated to use the services of the operator and manages the mobility of the UE across the gNBs (gNodeBs). A Session Management Function (SMF) manages the sessions of UEs, while AMF transmits the session management messages between the UEs and SMF. A User plane function (UPF) performs the processing and forwarding of the user data. A Network Slice Selection Function (NSSF) is responsible for the management and orchestration of network slices. A Communication Service Management Function (CSMF) translates the requirements of services to requirements relating to network slices.

Various raw network logs (not shown in FIG. 1*a* or FIG. 1*b*) are generated by the network functions, which will be gathered and contained in the smart contract 30 for SLA verification. For example, a network resource log file may be related to response time of the sliced network, and another network resource log file may be related to throughput of the sliced network. As such, the network resource log files may contain valuable information related to SLAs to determine whether the performance requirement was fulfilled. However, conventionally all raw network logs are transmitted to and stored in the blockchain, which increases the blockchain size tremendously. Also, validating SLAs using the raw network logs is computationally intensive.

On the other hand, in conventional art, SLAs are kept as SLA records on the blockchain, and as shown in FIG. 1*a* at any time point there may be overdue SLA records 28*a* as well as non-overdue SLA records 28*b*. In one example, an SLA record becomes overdue when an SLA Record Retention Date in the SLA record has passed, indicating that SLA record may be removed. For instance, an SLA record may be required to be kept for six months after termination of the service contract between a provider and a tenant, due to regulatory requirements. However, in conventional art when SLA is overdue, there no mechanism to remove the overdue records on the blockchain, which will result in that the SLA validation process will be degraded. This is particularly the case as all blocks in the blockchain are synchronized among all the peers, thus the overdue SLA records 28*a*. In this regard, the example shown in FIG. 1 has three peers (Peer1, Peer2 and Peer3), and they all synchronize the same blocks for SLA records 28*a*, 28*b*.

Systems and methods provided by exemplary embodiments of the invention therefore are adapted to improve efficient 5G network resource sharing that is based on blockchain technology. The network resource sharing for example could be based on network slicing or SIM card access as briefly introduced above. The improvements are based on on-chain and off-chain techniques in network resource log validation.

Figure 2:
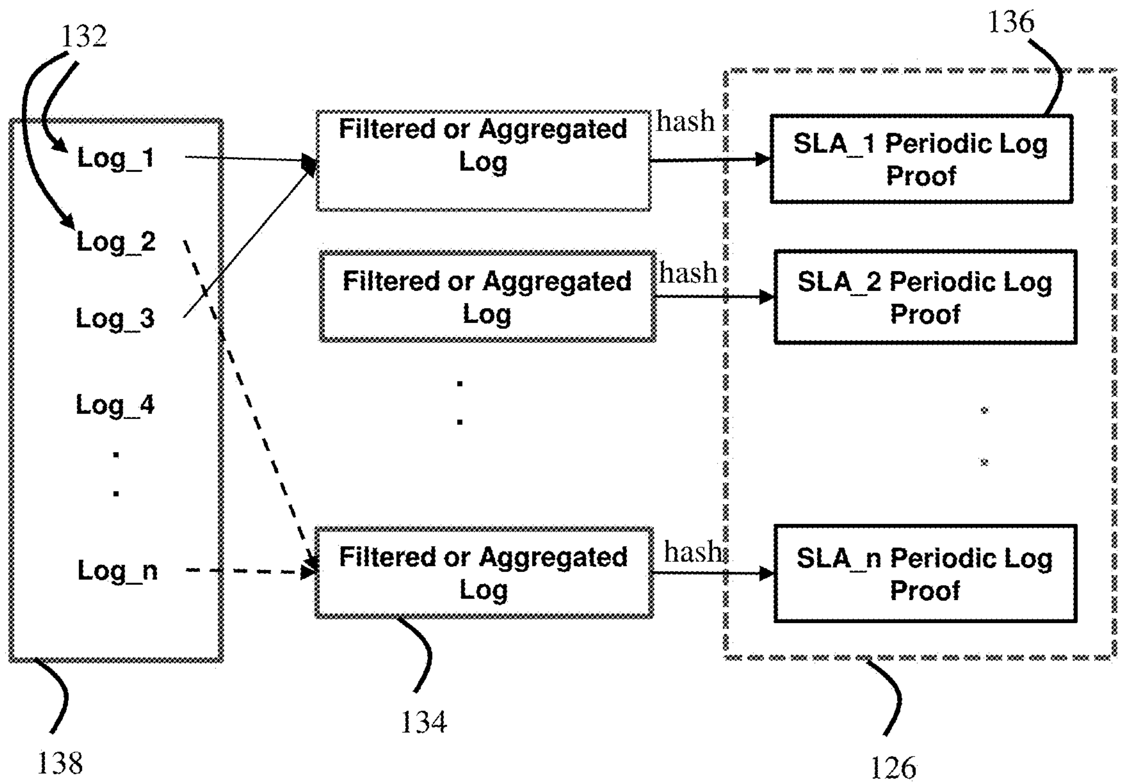
FIG. 2 shows the block diagram of log files and a blockchain in a method of reducing a size of a blockchain, according to one embodiment of the invention.
Figure 3:
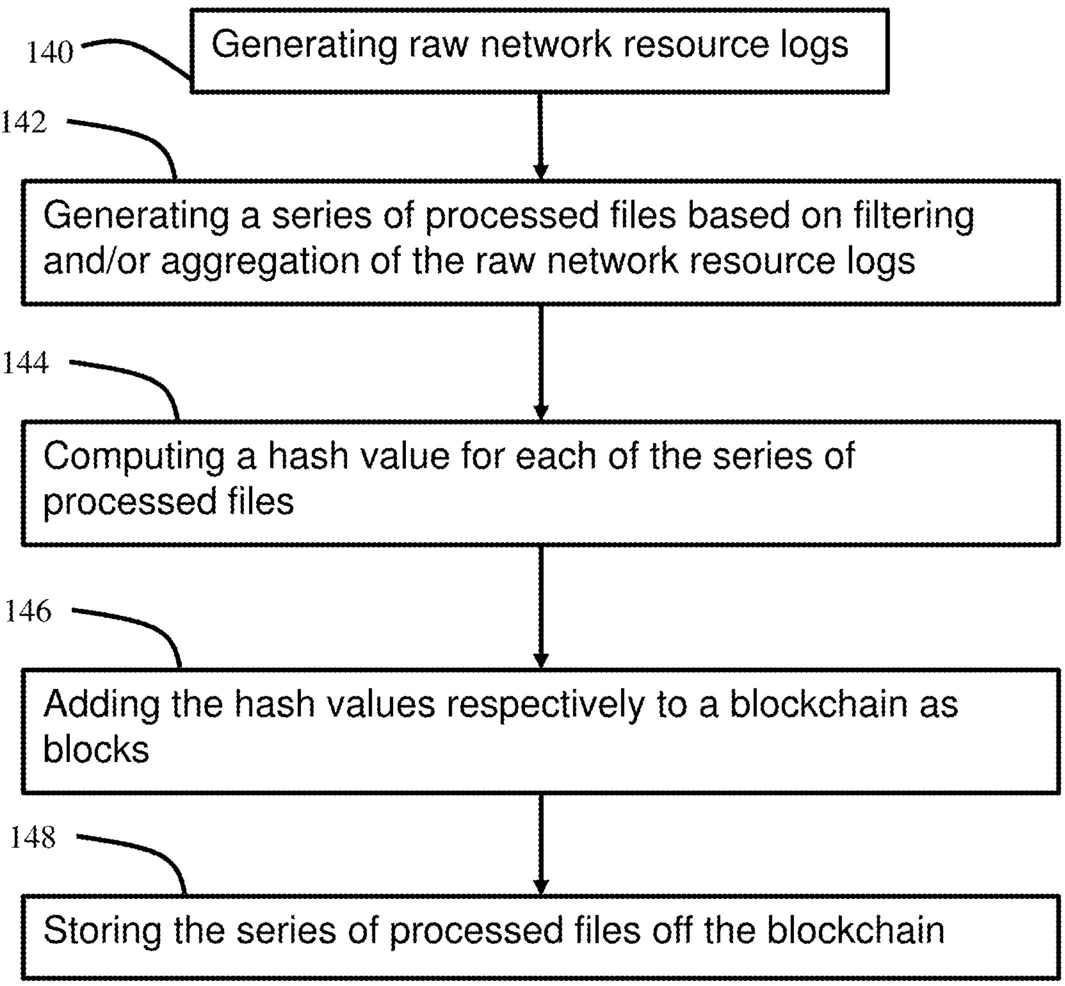
FIG. 3 is a flowchart showing main steps of the method of FIG. 2.

Turning to FIG. 2, an embodiment of the invention provides a method that validates SLAs in 5G network resource sharing using log hashes instead of raw network resource logs to reduce the blockchain size required. The network resource providers create hashed network logs on the blockchain as proofs, and provide raw log off-chain for validation. The network resource tenants in turn request both the hashed network logs and the raw logs from the providers for conducting SLA requirement validation. Main steps of the method are illustrated in FIG. 3, which will be described now with reference to the block diagrams in FIG. 2. Firstly, in Step 140 a series of raw network resource files 132 are provided by various network functions similar to those mentioned above. Each of the raw network resource files 132 is a data file that is stored in a database 138 of the network resource provider(s). Examples of the raw network resource files 132 include log files respectively for bandwidth, throughput, and latency of network capacity leased to a tenant. There is no limitation to the timing that various raw network resource files 132 are generated-they could be generated substantially at the same time, sequentially, or otherwise. Then, in Step 142, a series of filtered or aggregated log files 134 are generated based on the raw network resource files 132. The filtered or aggregated log files 134 are processed files that are obtained after filtering the raw network resource files 132, and/or as aggregation of two or more raw network resource files 132. In the example shown in FIG. 2, a first filtered or aggregated log file 134 in the series is an aggregation of Log_1 (e.g., about response time) and Log_3 (e.g., about throughout) from the series of raw network resource files 132. Another filtered or aggregated log file 134 in the series is an aggregation of Log_2 and Log_n from the series of raw network resource files 132. It should be noted that typically, the raw network resource files 132 are continuously generated as long as the sliced network is in operation, and as a result the filtered or aggregated log files 134 are also continuously generated. However, the filtered or aggregated log files 134 are generated periodically at a predetermined time interval (e.g., once per hour), and preferably such time interval is specified in the "Log Proof Condition" field in the SLA record that a filtered or aggregated log file corresponds to, as will be described in more details later. Because of this time interval, typically the number of the filtered or aggregated log file 134 within a certain time period (e.g., one day) is smaller than the number of raw network resource files 132 generated.

Next, in Step 144 a hash value is computed for each of the filtered or aggregated log files 134 as a periodic log proof. Because of the time interval mentioned above, the log proofs are generated periodically as a result of the filtered or aggregated log files being generated periodically. Note there is no limitation to the type of hash algorithm/function that is applicable to the method in this embodiment, and examples of hash algorithms that can be used include SHA-256 and SHA-512. Compared to the filtered or aggregated log file 134 which are at the same level as raw network resource files 132 in terms of size, the hashes are much smaller. Subsequently, the hashes are provided in a sequential way to the blockchain 126 in Step 146, and each hash is a part of a SLA periodic log proof that corresponds to a filtered or aggregated log file 134. The sequential addition of the hashes to the blockchain 126 is due to the fact that the series of filtered or aggregated log files 134 are generated recursively at the time interval (e.g., one per hour), so the hashes are generated also at the same frequency, and as soon as a hash is created it is committed to the blockchain 126, whereby a series of hashes are added to the blockchain 126 sequentially.

Figure 9:
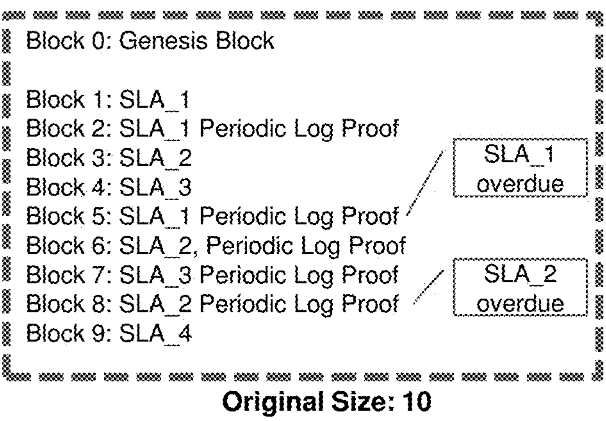
FIG. 9 shows structure of a blockchain before a pruning operation according to another embodiment of the invention.
Figure 10:
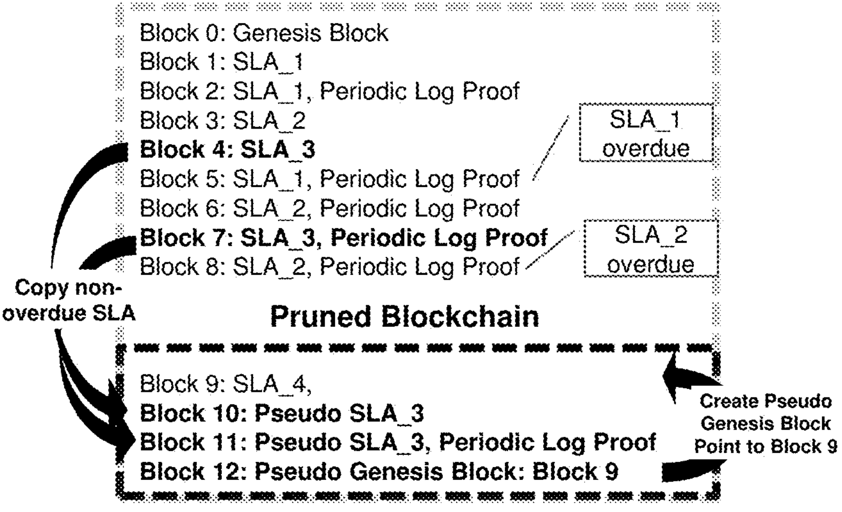
FIG. 10 shows the pruning operation to the blockchain and how the pruned blockchain is constructed.

In the example shown in FIG. 2, each hash stored in the blockchain 126 is part of a periodic log proof 136 for an SLA. It should be noted that although FIG. 2 shows distinct periodic log proofs 136 each for a different SLA, in the blockchain 126 for a same SLA there could be more than one periodic log proofs 136 (for example see the embodiment as shown in FIGS. 9-10). In addition, the blockchain 126 may store not only the periodic log proofs 136, but also SLA records (not shown in FIG. 2, but for example see the embodiment as shown in FIGS. 9-10). Finally, as the periodic log proofs 136 are saved on the blockchain 126, the filtered or aggregated log file 134 are saved off the blockchain 126 in Step 148, for example in the database 138 of the network resource providers. The database 138 may store other information or data such as the raw network resource log files.

FIG. 4 shows exemplary contents of an SLA record that may be stored in a blockchain for the providers and tenants of sliced network resources to access. There are various ID fields storing IDs of the SLA, the provider(s), and the tenant(s). The performance requirement under the SLA is also stored in the SLA record, and in FIG. 4 exemplary performance requirements include latency and reliability. Importantly, the SLA record also includes the "Log Proof Condition" field which specifies condition(s) that the provider needs to commit the proof of network log to blockchain. In the method of FIGS. 2-3, the time interval between generation of two filtered or aggregated log files can be set by the log proof condition in the SLA record, since as soon as a filtered or aggregated log file is created it shall be stored to the blockchain. Another field in the SLA record is the "SLA Record Retention Date" which as mentioned above determines when an SLA record can be removed from the blockchain. For example, an SLA record may be permitted to be removed after six months after the service contract between a provider and a tenant has terminated.

Figure 5:
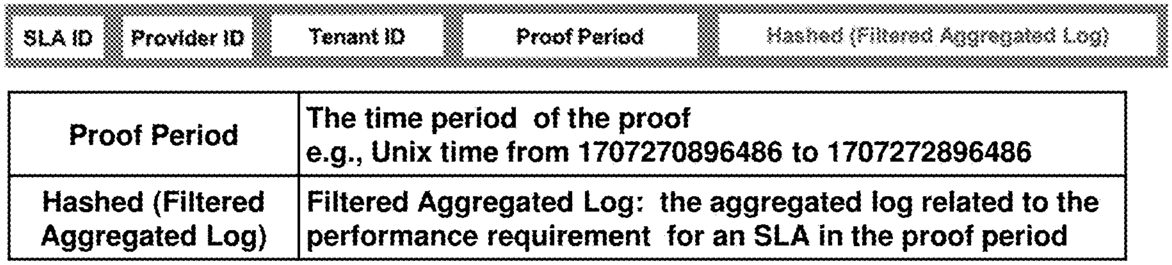
FIG. 5 shows data fields and their definitions in an exemplary SLA periodic log proof.

When the log proof condition is met (e.g., when an hour has passed since a previous log proof was saved to the blockchain), the provider commits the SLA periodic log proof to the blockchain. FIG. 5 shows exemplary contents of a SLA periodic log proof that may be stored in a blockchain for the providers and tenants of sliced network resources to access. There are various ID fields storing IDs of the SLA, the provider(s), and the tenant(s). The proof period for the particular SLA periodic log proof is also specified. In addition, the hash that was computed from a filtered or aggregated log file (shown as Hashed (Filtered Aggregated Log) in FIG. 5) and the filtered or aggregated log file are also stored in the SLA Periodic Log Proof. One can see that compared to raw network resource logs, the SLA periodic log proofs are significantly smaller in size since the payload in the SLA periodic log proofs are only hashes.

Figure 6:
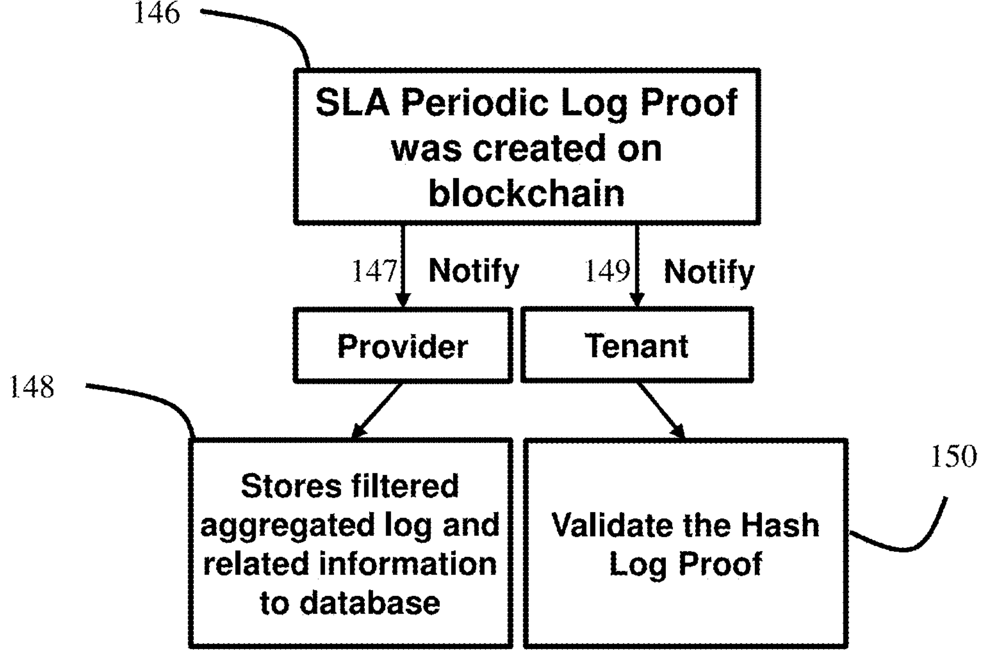
FIG. 6 shows the method steps of how the SLA periodic log proofs on the blockchain are provided to a provider and a tenant and be utilized by the latter.

Turning to FIG. 6, which shows Steps 146 and 148 of FIG. 3 in more details. As mentioned above, in Step 146 the hashes are provided to the blockchain, and since hashes are contained in the SLA periodic log proofs as exemplified in FIG. 5, in Step 146 in fact it is the SLA periodic log proofs that are committed to the blockchain, as shown in FIG. 6. Then, once the SLA periodic log proofs are created on the blockchain, the blockchain notifies the provider of the Block ID, SLA ID, Proof Period and the hashed log proof in Step 147. Similarly, the blockchain notifies the tenant of the Block ID, SLA ID, proof period and the hashed log proof in Step 149. Following Step 147, the provider in Step 148 saves the filtered or aggregated log file in its database, along with related information, as mentioned above and shown in FIG. 6. On the other hand, the tenant, if it desires so, may obtain the hash log proof at any time by querying the blockchain in Step 150, which will be described in more details later.

Figures 7, 8:
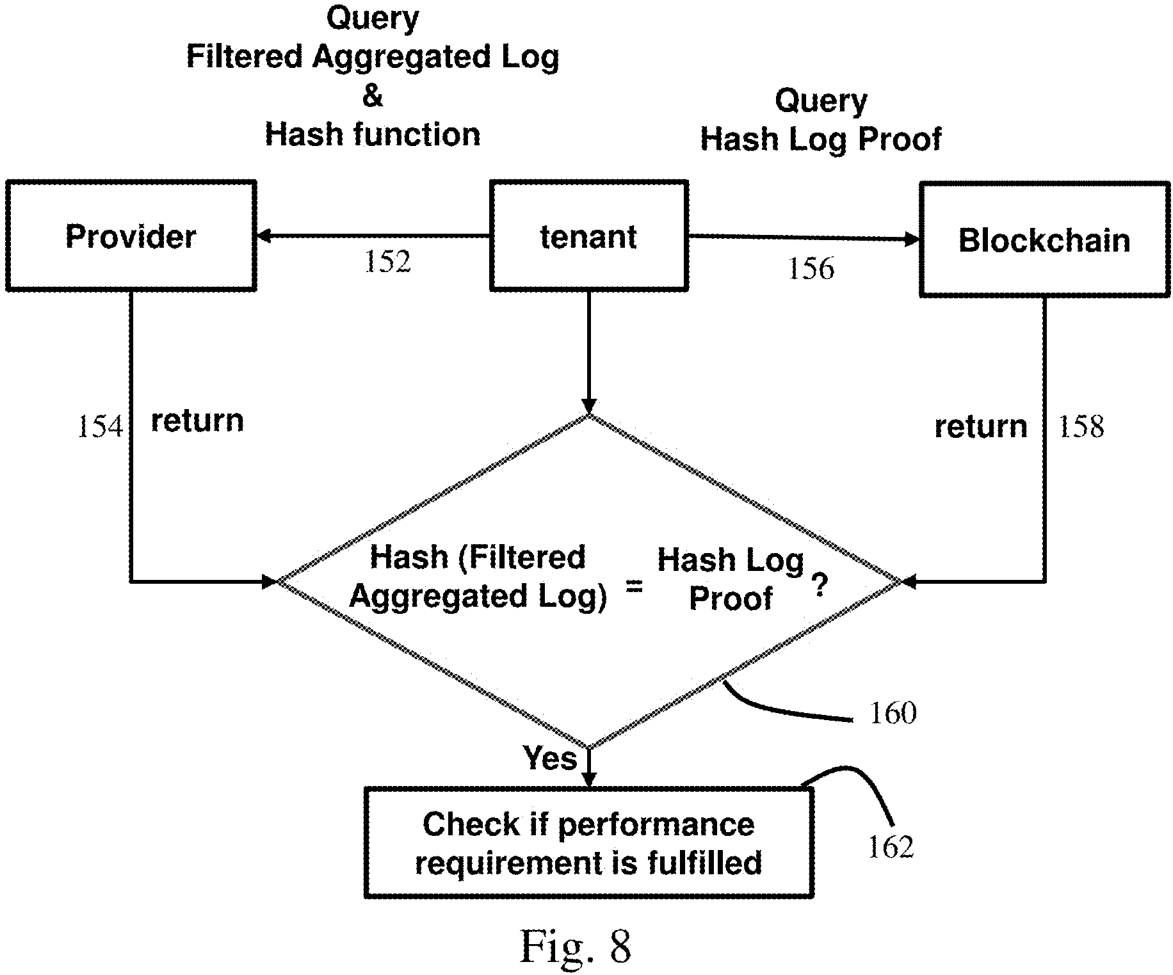
FIG. 7 shows data fields and their definitions in exemplary information notified by a blockchain to a network resource provider.
FIG. 8 shows the process of a tenant querying information from both the blockchain and the network resource provider, and using the same to check if performance requirement in SLA(s) is fulfilled.

FIG. 7 shows exemplary contents of the data that include the filtered or aggregated log file and related information, which are saved to the database of the provider in Step 148. There are various IDs saved, including that of the block on the blockchain that contains the hashed log proof, and the ID of the SLA that correspond to the log proof. In addition, the proof period for the generated SLA periodic log proof is also specified. The hash that was computed from a filtered or aggregated log file and the filtered or aggregated log file itself, are both stored in the database. Lastly, the hash function that is used to compute the hash is stored along with the hash. All the information is thus maintained by the provider, and can be requested by a tenant from the provider in case the tenant wants to verify an SLA. In a variation of the embodiments, the provider may save a link to the filtered or aggregated log file in its database, where the actual log file is stored in another location.

FIG. 8 illustrates an exemplary method of how a tenant requests information from both the network resource provider and the blockchain to verify an SLA, and in particular to check if any stipulated performance requirement in the SLA is met. In Step 152, the tenant queries the provider for the filtered or aggregated log as well as the hash function (but not the hash itself). The provider returns such information to the tenant in Step 154, and the tenant applies the hash function to the filtered or aggregated log to obtain a hashed value (H). Separately from Step 152, the tenant also queries the blockchain for the hash log proof in Step 156. The requested hash log proof is returned from the blockchain in Step 158. Subsequently, in Step 160 the tenant compares the H value obtained in Step 154 with the hash log proof from the blockchain. In other words, a comparison is made to see if proof on the blockchain Proofoff-chain equals to Proofonchain. If the H value is equal to the hash log proof from the blockchain, this means that the information kept by the provider is authentic, and then the tenant can check in Step 162 whether the performance requirement was fulfilled by analysing the filtered or aggregated log from the database of the provider. The tenant may repeat the steps in FIG. 8 for more than once in order to analyse different filtered or aggregated logs, for example for different SLAs and/or for the same SLA multiple times.

Turning to FIG. 9, in another embodiment of the invention there is provided a method of pruning a blockchain containing SLA records of a cellular network. The cellular network may be a sliced network. In summary, the method determines percentage of overdue blocks among all blocks on the blockchain, find an optimized location to prune the blockchain to minimize the blocks to be synchronized by all peers, and then generated a pruned blockchain. FIG. 9 shows an exemplary blockchain that is before any pruning operation is done. It can be seen that there is a genesis block (Block 0) as the first block in the blockchain. After Block 0, there are nine other blocks, which contain not only blocks storing SLA records (SLA_1, SLA_2, SLA_3, SLA_4), but also blocks storing periodic log proofs of one or more of these SLA records. In the example shown in FIG. 9, SLA_1 and SLA_2 are overdue, while SLA_3 and SLA_4 are not. Apparently, with the overdue SLA records on the blockchain, all peers need to synchronize the blockchain that contains the overdue SLAs, which not only requires more space to save the blocks but also it leads to a prolonged validation process.

Figure 11:
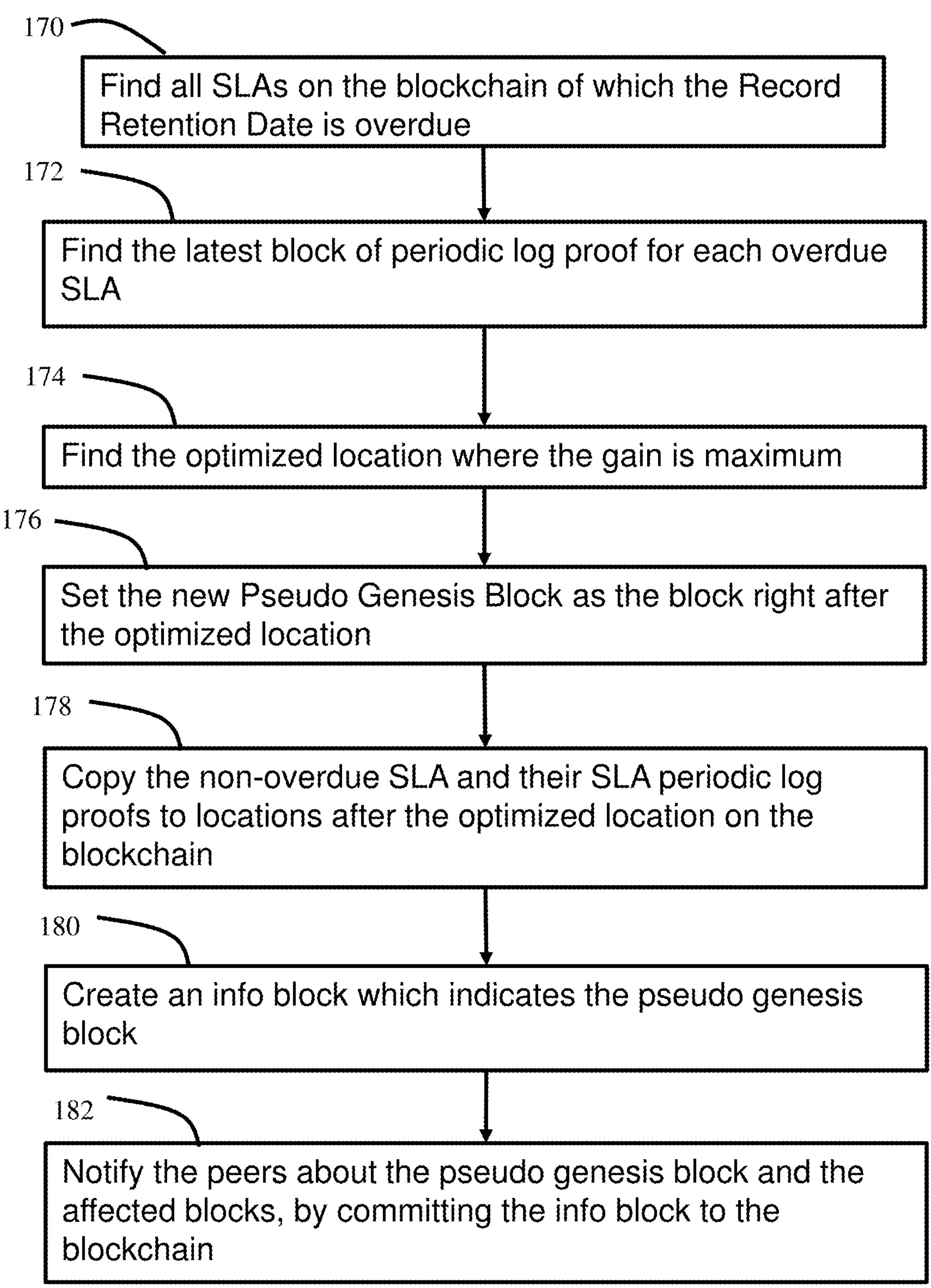
FIG. 11 is a flowchart showing main steps of the method of FIG. 10.

In FIG. 10, the method of pruning the blockchain is illustrated by showing the structure of the pruned blockchain and how certain blocks in the complete blockchain are copied to other locations in the blockchain. The flowchart for the method is shown in FIG. 11. There could be different criteria for determining whether the pruning operation should be done. For example, the percentage of overdue blocks (i.e., blocks for which the SLA Record Retention Date has passed) among all blocks on the blockchain can be continuously monitored. In the blockchain shown in FIG. 9, there are ten blocks in total, and six of them are overdue which are Blocks 1, 2, 3, 5, 6 and 8, since these blocks relate to SLA_1 or SLA_2 and each contains either an SLA record or a periodic log proof. The percentage of overdue blocks is therefore 60% in FIG. 9. When the percentage of the overdue blocks exceeds a threshold value (e.g., 60%), then the pruning mechanism may be automatically carried out.

The pruning method starts at Step 170 in FIG. 11, in which all SLAs for which the record retention date is overdue are identified by scanning the entire blockchain from a genesis Block or a pseudo genesis block to the latest block. In the example shown in FIG. 9, this means that all blocks from the genesis block (Block 0) to the latest block (Block 9) are scanned. As mentioned above, in the example of FIG. 9 it is assumed that SLA_1 and SLA_2 are overdue. Then, in Step 172 the latest block of periodic log proof for each overdue SLA is found. For SLA_1, the latest block that contains a periodic log proof is Block 5, and for SLA_2 the latest block that contains a periodic log proof is Block 8. In general, suppose that there are n overdue SLAs, then the latest block array would become:

$$\text{Latest Blocks}=\{(a_1,a_2,\ldots,a_n)|a_1,a_2,\ldots,a_n\in\text{Block number}\} \quad (1)$$

Then, in Step 174 an optimized location for the pruning operation is determined by finding a location that corresponds to a maximum gain. Here the gain is defined as $g(a_i)$ which equals to the number of block can be reduced after pruning, minus the number of extra block that need to be crated (i.e., number of blocks that need to be copied to the pruned blockchain). For each location that is on the blockchain, an individual gain can be calculated according to the above definition, but there is at least one location which if chosen as the pruning location will result in a maximum gain as compared to other locations. In general form, the optimized location is calculated by argmax ($[g(a_1), g(a_2), \ldots, g(a_n)]$), so the location that results in the maximum gain is returned by the argmax operation. In the example of FIG. 9, the maximum gain appears when the pruning location is at Block 8 (i.e., when all preceding part of the chain including Block 8 is pruned and not included in the pruned chain), and the optimized location is therefore at Block 8. The block right after the optimized location will be set as a pseudo genesis block in Step 176. FIG. 10 shows the status of the blockchain after the pruning operation with Block 8 as the optimized location, and one can see that Block 0 to Block 8 in the blockchain are removed (pruned), and starting from Block 9 the rest of the blocks are kept in the pruned blockchain. Block 9 then becomes the pseudo genesis block.

Once the optimized location has been chosen, the method then proceeds to steps of actually pruning the blockchain. Firstly, in Step 178, the non-overdue SLA and their SLA periodic log proofs (if any) are copied to locations after the optimized location on the blockchain. The copied blocks become extra blocks added to the blockchain. As shown in FIG. 10, in the example SLA_3 and SLA_4 are not overdue, so Blocks 4 and 7 that respectively contain the SLA record for SLA_3 and the periodic log proof for SLA_3 are copied and result in new blocks 10 and 11 respectively. Subsequently, a new info block that indicates Block 9 as the pseudo genesis block is also added to the blockchain in Step 180, which becomes Block 12. Lastly, in Step 182 the pseudo genesis block and the affected blocks (which are the blocks that are removed from the pruned blockchain) are notified to the peers. The peers can choose to synchronize the blocks starting from the pseudo genesis block (so the peers will deal only with uncompleted SLA) or to synchronize the entire blockchain (at the cost of degraded performance of SLA validation), based on their needs. As shown in FIG. 10, the original blockchain with a size of 10 becomes a pruned blockchain with a size of 4 after the pruning operation, and there is a 60% reduction of the size of the blockchain. It should be understood that the blockchain certainly is not actually cut or truncated due to its characteristics that blocks cannot be altered retroactively, but with the introduction of a pseudo genesis block it makes possible for peers to only synchronize part of the entire blockchain, such that the computation complexity and space requirement are reduced.

An experiment was set up to assess the performance improvements achieved individually by the method in FIGS. 2-3, and the method in FIGS. 10-11. For the experiment, a scenario is set that there are 100 SLAs, and 10 network logs/minute for each SLA. The size of each log is 100 bytes. The Proof Periods is set to be per hour (thus each day there are 24 SLA periodic log proofs generated for each SLA). The size of the SLA periodic log proof is set to be 100 bytes each. The SLA period is set to be one month (with block overhead is ignored).

Figure 12:
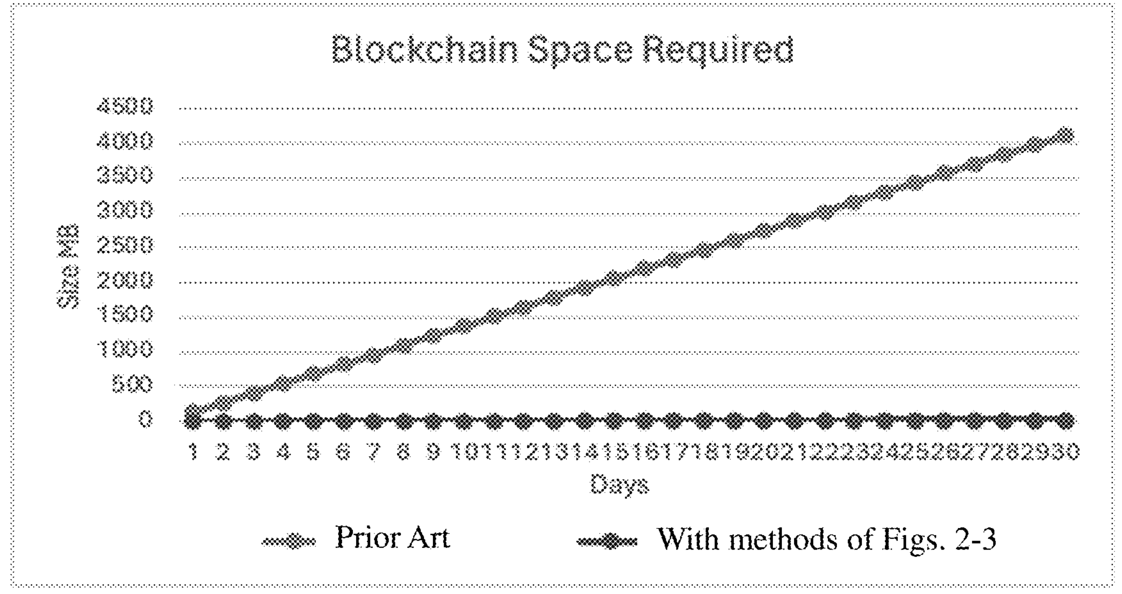
FIG. 12 shows experiment results of the method in FIGS. 2-3 as compared to conventional art.

The performance of the method in FIGS. 2-3 is shown in FIG. 12, with a comparison to the same scenario but without using the method in FIGS. 2-3. One can see that with the use of the method in FIGS. 2-3, the size of the blockchain grows linearly with the hashed log size, but at a much lower rate compared to storing raw logs directly on the blockchain. In terms of numerical results, with the use of the method in FIGS. 2-3, the size of the blockchain is only about 7.2 MB, and the data (including filtered or aggregated logs) saved off the chain is about 4 GB. In comparison, if the method is not used, then the size of the blockchain will be 4 GB as all the filtered or aggregated logs are saved on the blockchain.

For the method in FIGS. 10-11, the numerical results indicate that after the pruning of the blockchain, the size of the blockchain is only 1.7 GB (in terms of the part of the chain that is synchronized with peers, not the entire chain), and the size of the entire chain is 4.5 GB (which are not necessary to be synchronized). In comparison, without the use of the method in FIGS. 10-11, the size of the blockchain is 4 GB, and the whole blockchain needs to be synchronized by all peers. The size of the chain with the pruning method used is slightly larger than if the method is not used because of the extra blocks copied to the chain (similar to those mentioned in Step 178 as mentioned above). One can see that if the providers must validate and commit the network log directly on the blockchain, the providers can utilize the techniques provided in FIGS. 10-11 to prune the blockchain and shorten the number of blocks. As a result, the size of the blockchain synchronized by peers can be reduced.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, although the method in FIGS. 2-3 and the method in FIGS. 10-11 are independent from each other and do not require each other to be carried out, it is possible to combine the two methods and apply them to the same blockchain. For example, the SLA periodic log proofs shown in FIGS. 9-10 may be generated using the method in FIGS. 2-3, so that not only the raw network resource log files need not be saved to the blockchain, but even if the blockchain contains only hashes (log proofs), the blockchain can be pruned to achieve further size reduction and validation process enhancement.

The functional units and modules of the systems and methods in accordance with the embodiments disclosed herein may be implemented using computing devices, computer processors, or electronic circuitries including but not limited to application-specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, and mobile computing devices such as smartphones and tablet computers.

The embodiments include computer storage media, transient and non-transient memory devices having computer instructions or software codes stored therein which can be used to program computers or microprocessors to perform any of the processes of the present invention. The storage media, transient and non-transitory computer-readable storage medium can include but are not limited to floppy disks, optical discs, Blu-ray Disc, DVD, CD-ROMs, magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in a distributed fashion by one or more processing devices interconnected by a communication network, such as an intranet, WAN, LAN, the Internet, and other forms of data transmission medium.

The invention claimed is:

1. A computer-implemented method of pruning a blockchain containing Service Level Agreement (SLA) records of a cellular network; the method comprising steps of:

a) identifying, on a blockchain, a SLA record that is overdue;

b) identifying, on the blockchain, a latest block representing a proof of the SLA record;

c) determining an optimized location on the blockchain that corresponds to a gain that is maximum;

d) setting a next block after the optimized location as a pseudo genesis block; and e) defining part of the blockchain that starts with the pseudo genesis block as a pruned chain.

2. The computer-implemented of claim 1, wherein the SLA record that is overdue has a retention date which has passed.

3. The computer-implemented of claim 1, wherein the gain is calculated as a number of block(s) that can be pruned before the pseudo genesis block, minus a number of extra block(s) that need to be replicated after the pseudo genesis block.

4. The computer-implemented of claim 3, wherein the extra block(s) comprising one or more blocks each representing a non-overdue SLA record or a log proof thereof.

5. The computer-implemented of claim 4, wherein the log proof of the non-overdue SLA record is a hash value of a processed file based on filtering and/or aggregation of one or more data files; the data files being network resource log files of the cellular network.

6. The computer-implemented of claim 1, further comprises, before Step a), a step of determining a percentage of all overdue blocks on the blockchain among all blocks on the block chain; the method going to Step a) only when the percentage is above a threshold.

7. The computer-implemented of claim 1, wherein Step a) further comprises identify more than one SLA records that are overdue; and Step b) further comprising identifying a latest block for each of the overdue SLA records.

8. A non-transitory computer-readable medium having computer instructions recorded thereon, the computer instructions, when executed on one or more processors, causing the one or more processors to perform operations according to the method according to claim 1.

9. A computing system comprising:

one or more processors; and memory containing instructions that, when executed by the one or more processors, cause the computing system to perform operations according to the method of claim 1.

* * * * *